(12) United States Patent
Shi et al.

(10) Patent No.: US 7,734,412 B2
(45) Date of Patent: Jun. 8, 2010

(54) METHOD OF CLIENT SIDE MAP RENDERING WITH TILED VECTOR DATA

(75) Inventors: Norman X. Shi, Fremont, CA (US); Xiaoyi Wu, Pleasanton, CA (US)

(73) Assignee: Yahoo! Inc., Sunnyvale, CA (US)

( * ) Notice: Subject to any disclaimer, the term of this patent is extended or adjusted under 35 U.S.C. 154(b) by 382 days.

(21) Appl. No.: 11/592,564

(22) Filed: Nov. 2, 2006

(65) Prior Publication Data

US 2008/0109159 A1    May 8, 2008

(51) Int. Cl.
G01C 21/30    (2006.01)
(52) U.S. Cl. ........................................ 701/208; 701/212
(58) Field of Classification Search ................ 701/208, 701/209, 211, 212; 341/50, 51, 87; 342/356, 342/357.01, 357.02, 357.03; 709/203, 232
See application file for complete search history.

(56) References Cited

U.S. PATENT DOCUMENTS

| | | | |
|---|---|---|---|
| 5,028,848 A | 7/1991 | Bankston et al. | |
| 5,471,572 A | 11/1995 | Buchner et al. | |
| 6,564,224 B1 | 5/2003 | Wu et al. | |
| 6,873,329 B2 | 3/2005 | Cohen et al. | |
| 7,068,398 B2 | 6/2006 | Rijavec | |
| RE40,466 E * | 8/2008 | Wallner | 341/50 |
| 2004/0078143 A1 | 4/2004 | Howard et al. | |
| 2004/0157641 A1 | 8/2004 | Chithambaram et al. | |
| 2004/0246261 A1 * | 12/2004 | Akitsune et al. | 345/581 |
| 2005/0028070 A1 | 2/2005 | Lin et al. | |
| 2005/0228780 A1 | 10/2005 | Diab et al. | |
| 2005/0243097 A1 | 11/2005 | Cohen et al. | |
| 2006/0170693 A1 | 8/2006 | Bethune et al. | |

OTHER PUBLICATIONS

Anonymous. (Aug. 2006). "Comparing Vector and Raster Mapping for Internet Applications: An ESRI White Paper," located at <http://www.esricanada.com/documents/vector-raster-mapping.pdf>, last visited on Jun. 10, 2008, thirteen pages.
International Search Report and Written Opinion mailed on May 26, 2008, for PCT Application PCT/US2007/023067, filed on Oct. 31, 2007, ten pages.
Campin, B. (2005). "Use of Vector and Raster Tiles for Middle-size Scalable Vector Graphics' Mapping Applications," located at <http://www.svgopen.org/2005/papers/VectorAndRasterTilesForMappingApplications/inde...>, last visited on Aug. 31, 2006, 13 pages.
Placebase. (2006). "Rendermap™," located at <http://www.rendermap.com>, last visited on Aug. 31, 2006, two pages.
International Preliminary Report on Patentability mailed on May 14, 2009, for PCT Application No. PCT/US2007/023067 filed on Oct. 31, 2007, six pages.

* cited by examiner

Primary Examiner—Gertrude Arthur Jeanglaud

(57) ABSTRACT

In one example, an apparatus and method are provided for rendering map images. In one example, an apparatus (e.g., a map server) includes logic for causing the transfer of tiled vector image data in response to a map request, wherein the vector data is associated with stored map data divided into a plurality of tiles. The tiled vector image data is transferred to a remote device (e.g., a client device) for rendering of the map image. Additionally, the vector image data may comprise one or more attributes associated therewith, the one or more attributes configurable by a receiving device. For example, the map image may be rendered (e.g., customized) based on one or more local attributes to vary the language used, colors, how items in the map are displayed, and other imaging characteristics of the map image.

28 Claims, 4 Drawing Sheets

METHOD OF CLIENT SIDE MAP RENDERING WITH TILED VECTOR DATA

BACKGROUND

1. Field

The present invention relates generally to systems and methods for rendering large images, such as maps, in client-server systems, and in one particular example, to client-side rendering of a map image according to received tiled vector image data.

2. Related Art

Various map and geographic information systems are known in the art. For example, various Web-based mapping services operating to deliver map image data to clients via a Web browser are known. Generally, the map image data may span large geographic areas and may be displayed in several discrete zoom levels. The map image data may further include various additional services, such as street names, addresses, and businesses for display with or overlaying the map image.

In a typical client-server environment, such as a Web based mapping service, map images are generally rendered on the server side in response to a user request for a map image and transferred to the client for display. For example, in response to a user request for a map image, a map server renders the appropriate image data for the location and zoom level associated with the request, renders the image data, and communicates the image data to the client (e.g., as JPEG or bitmap data). The image data is generally communicated to the client as raster image data, e.g., data for displaying an image as a collection of independently controlled dots or pixels arranged in rows and columns, which together form an image of the desired map. Raster image data may include bitmap data for producing the desired image, the bitmap data including a collection of pixels that represent an aerial or satellite photograph, graphical image, or the like of a geographical location (e.g., a city or neighborhood).

Map servers generally store terabytes or more of data associated with large map images and for transfer to clients (in some examples, however, the map data is not stored physically with the map server; rather, the map data is accessed by the map server from a local or remote database). The loading or rendering of map data for delivery to a client in response to a request is generally computationally burdensome on the server side, the client-side, or both. Accordingly, current Web based map image systems, e.g., based on rastor image data, generally suffer from several drawbacks. For example, zooming (or scaling) of the map image generally requires additional map data to be retrieved by the map server for display, and as such, generally requires greater storage and computational demands on the server to store and render each offered zoom level. Accordingly, as a client changes the zoom or pans within the map, there is often a time lag in the display of the map as the map server accesses, renders, and transfers the new map data corresponding to the new zoom level or view to the client.

Further, rastor images are generally optimized for display on a client display device such as a computer monitor or handheld device screen (e.g., at a resolution of approximately 1280×1024 and about 80-100 pixels per inch); however, such resolution optimized for display on a monitor is generally well below a desired resolution for printing. For example, typical printer resolution may be on the order of 600 dots per inch or greater such that printing a map rendered at a relatively low resolution (e.g., 80-100 pixels per inch) used for display results in relatively low quality printed image (compared with the printer's capability). Increased image resolution described for printing, however, would further burden the server, client, or both during map image rendering operations.

Accordingly, it is desired to provide a system and method for rendering images such as map images in a fast and efficient manner; for example, with reduced computational and storage demand on the server. Additionally, it is desirable to provide a system and method for rendering images that may be zoomed more efficiently and printed at higher resolution by a client.

BRIEF SUMMARY

According to one aspect of the present invention an apparatus and method for rendering maps is provided. In one example, an apparatus is provided for transferring tiled vector map data to a client for client-side rendering of the map image. In particular, the apparatus may include transfer logic for causing the transfer of tiled vector image data to a client device, wherein the vector data is associated with map data divided into a plurality of tiles. The tiled vector image data may be rendered by the client device to display the map image.

Additionally, the vector image data may comprise one or more attributes associated therewith, the attributes configurable by a receiving device. For example, the map image may be rendered based on one or more local attributes to vary the language of text displayed with the map, colors, how items in the map are displayed (e.g., how to display a highway or side street), and other imaging characteristics of the map image. A client device may thereby customize the way in which a map is rendered and displayed.

In another example, an apparatus is provided for receiving tiled vector map data and rendering the image with local or client attributes. For example, a client device includes logic for receiving tiled vector data and rendering the map data using local attributes. Local attributes may include, for example, user preferences, user profile information, language settings/preferences, graphical settings, and the like. Accordingly, the apparatus renders the map image data for display based on stored (or accessed) preferences for the particular client.

According to another aspect, a method for client-side map rendering of tiled vector data is provided. In one example the method includes transferring vector image data to a receiving device, the vector image data for displaying a map image, wherein the vector image data comprises a tile of vector image data associated with map image data divided into multiple tiles. The vector image data may be transferred to a remote or client device for client-side rendering of the map image, and may be rendered based on a set (e.g., one or more) of attributes associates with the receiving device.

According to another aspect, a computer program product including program code for rendering tiled vector map image data is provided. In one example, the product comprises program code for causing a transfer of tiled vector image data to a receiving device for display of a map image, wherein the vector data is associated with stored map image data divided into a plurality of tiles.

According to another aspect, a computer program product including program code for rendering tiled vector map image data is provided. In one example, the product comprises program code for causing the rendering of vector image data based upon received vector image data and a set of local attributes, wherein the vector image data is associated with at least one tile of map image data.

DETAILED DESCRIPTION

Figure 1:
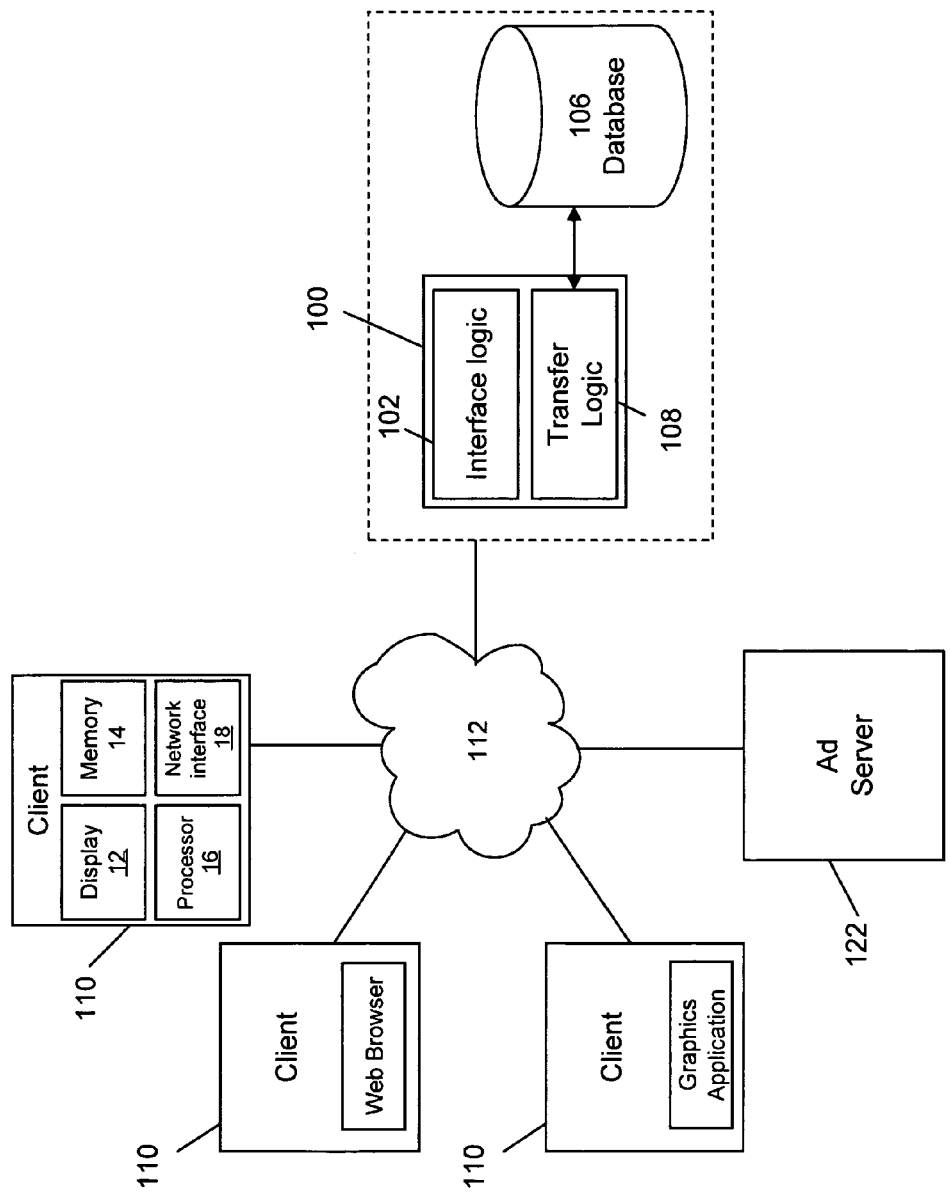
FIG. 1 illustrates an exemplary environment in which some aspects and examples described herein may by used.

The following description is presented to enable a person of ordinary skill in the art to make and use the various aspects of the present invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the inventions. Thus, the present invention is not intended to be limited to the examples described herein and shown, but is to be accorded the scope consistent with the claims.

In one example of the present invention an apparatus (e.g., a map server) is described for facilitating client-side map rendering of tiled vector image data. Vector image data (or "vector data") generally includes mathematical descriptions that determine the coordinates, length, and direction in which lines are drawn to form an image; for example, images are created as collections of points, lines, and areas (as opposed to merely patterns of individual dots/pixels as in a rastor image). In one example, the apparatus includes logic for causing the transfer of vector image data to a client device in response to a request for at least a portion of a map image, the vector data associated with at least one tile of the map image. For example, a client may request a location or address at a particular zoom level (e.g., a default zoom level set by the system or request), the apparatus operable to cause the transfer of data related to one or more vector data tiles for rendering on the client-side to cover the graphical viewing area.

The received vector data may be rendered by the client device, e.g., via vector rendering capability of a browser application or a graphics application running on a client device, such as Scalable Vector Graphics (SVG), Canvas, Vector Markup Language (VML), Java Applet, Open Graphics Library (OpenGL), Flash, or the like. Client-side rendering of vector data tiles may provide, among other things, improved image quality for displaying on a client device as well as improved resolution capabilities for printing. Zooming and panning functions, both the speed and continuity of zooming and panning, may further be improved with vector image data because the client device generally only needs to recompute the vector data for the new zoom or panned map image (without receiving additionally image data from the map server, which reduces strain on the map server). Additionally, client-side rendering of vector data tiles may allow a user to modify and customize the display of the map data based on local or user defined attributes. For example, a user may customize the presentation of the vector data, e.g., to change the language, line widths or schemas, colors, etc. of the displayed map image with relatively little or no additional processing requirements on the map server (compared to a rastor image system).

FIG. 1 illustrates an exemplary environment in which some examples of the vector-based map rendering described may be used. In particular, FIG. 1 illustrates a client-server environment in which one or more clients 110 may communicate with a map server 100 via a network 112. Map server 100 may include interface logic 102 for interfacing with network 112 and including http Web server logic, for example. Further, map server 100 includes (or accesses) a database 106 for storing image data, such as one or more map images, and transfer logic 108 for causing the retrieval/transfer of image data from database 106 and to network 112/client 110 via interface logic 102. Further, map server 100 and database 106 may include or access various data or databases, including spatial data, attribute data, advertisement data, point of interest data, etc. associated with rendering a map and displaying items therewith. The map image data may be stored in database 106 as multiple tiles or divided into tiles as retrieved (as described in greater detail with respect to FIG. 2 below).

Map server 100 includes logic or is programmed to process map data, accessed from local or remote databases or other sources of data, for transfer to users of clients 110, preferably in the format discussed in the examples herein. To that end, map server 100 may utilize various Web data interface techniques such as Common Gateway Interface (CGI) protocol and associated applications (or "scripts"), Java® "servlets", i.e., Java® applications running on the Web server, or the like to present information and receive input from clients 110. Map server 100, although described herein in the singular, may actually comprise plural server computers, gateways, devices, backends, and the like, communicating (wired and/or wireless) and cooperating to perform some or all of the functions described herein.

Map server 100 may include various other components known in the art, e.g., a scripting engine (such as a PHP scripting engine), an aggregation engine, and the like. A scripting engine may include authentication logic, upload logic, metadata processing logic, and permissions handling logic. The authentication logic authenticates a user signing on to the map server web site. The upload logic may be used to upload data (e.g., media objects or attributes) from the client to the server data. The aggregation engine may include a statistics engine and a search engine.

Clients 110 and map server 100 may communicate, e.g., via suitable communication interfaces via a network 112, such as the Internet. Clients 110 and map server 100 may communicate, in part or in whole, via wireless or hardwired communications, such as Ethernet, IEEE 802.11b wireless, or the like. Additionally, communication between clients 110 and map server 100 may include various other servers such as a web server, photograph/image server, media server, mail server, mobile server, and the like.

Information received from client 110 may include, e.g., a map request, search request, GPS coordinates (e.g., manually entered, provided by a GPS location device, cell identification, inferred from a user profile or associated data, or via other location technologies).

Client 110 may include various devices such as mobile devices such as a PDA, mobile telephone, smart phone, pager, walkie talkie, radio frequency (RF) device, infrared (IR) device, Wi-Fi device, pocket personal computer, tablet personal computer, laptop computer, and integrated devices combining one or more of the preceding devices, as well as a desktop computer, and the like. The device of client 110 may include a processor 16 connected to an input device such as a keyboard (not shown), a network interface 18, a memory 14, and a display 12. The memory 14 may include logic or software operable with the client device to perform some of the functions described herein. The client device may be operable to display a web browser for accessing the Internet, including Web based map services such as Yahoo!® Maps, for example.

In one example, client 110 includes programming logic for rendering vector based image data. For example, client 110 includes a Web browser application having vector rendering capabilities native thereto or as a plug in thereto; in other examples, client 110 may render vector based image data without the use of Web browser capabilities, for example, via a vector rendering program or logic included with a graphics application.

FIG. 1 further illustrates an advertisement server 122, which may communicate with map server 100, one or more clients 110, or both. Advertisement server 122 may operate to associate advertisements with map image data communicated to a client 110, for example, including an advertisement within the map itself or for display adjacent the map. In one example, the advertisement server 122 communicates with map server 100 and transmits advertisement data thereto, for example, in response to information received from map server 100 or client 110. The map server 100 then transmits the advertisement data with map image data to client 110. In other examples, the advertisement server may send the advertisement data directly to client 110 based on information from map server 100, client 110, or both.

It should be noted that although the exemplary methods and systems described herein describe use of separate servers and databases for performing the various functions, other embodiments could be implemented by storing the software or programming that operates to cause the described functions on a single server or any combination of multiple servers as a matter of design choice so long as the functionality described herein is performed. Although not depicted in the figures, map server 100 generally includes such art recognized components as are ordinarily found in server systems, including but not limited to processors, RAM, ROM, clocks, hardware drivers, associated storage, and the like (see, e.g., FIG. 6, discussed below).

Figure 2:
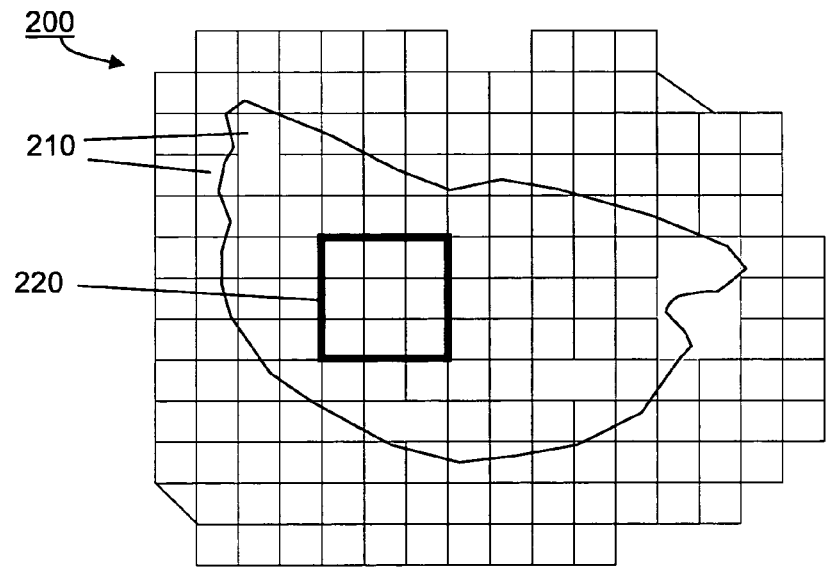
FIG. 2 illustrates schematically an exemplary method of dividing an image into a plurality of tiles for client-side rendering.

FIG. 2 illustrates schematically an exemplary method of dividing an image into a plurality of tiles for client-side map rendering. As shown, a map image 200 may be divided into a plurality of map tiles 210, each of which may be separately processed by a map server and transferred to a client for rendering as an image of a portion of the larger map image 200. For example, each map tile 210 of map image 200 may be sent to a client for rendering as a separate portion or set of vector image data. Map tiles 210 may vary in size for different applications and different processing capabilities of a client device. The division of map image 200 into map tiles 210 may be stored, e.g., in a database associated with a map server, or may be determined at the time of a map request (e.g., based on the request or requesting client device). Further, although shown as square in FIG. 2, map tiles 210 may include any shape, e.g., rectangular, circular, elliptical and so on, and individual tiles 210 may vary in shape and size as well.

Additionally, map tiles 210 may include regions of overlap (e.g., adjacent tiles may overlap and cover the same area). Such a feature may be advantageous for imaging features or attributes near or crossing a border of two adjacent tiles (e.g., compared with a method and system utilizing non-overlapping tiles).

In some examples, a group of map tiles 220 may be selected for transfer to a client device. A group of tiles 220 may be chosen based on a requested zoom level, and may be greater than a requested zoom level requires for facilitating zoom and pan functions more readily. For example, a group of tiles 220 centered about one or more tiles 210 that encompass a requested location and zoom level may be selected and transferred to a client device for use by the client device if a user zooms out or pans within the map image. Memory associated with the client device, e.g., browser caching, may be used to effectively save data transmission for some zoom and pan functions. Of course, at some limit, additionally map tiles 210 may be selected and transferred to the client device for facilitating zoom and pan functions.

Map 200 may correspond to a geographical region the size of a country, continent, or even an entire planet. For example, a map database may contain all tiles for the United States, the entire map data divided into hundreds of tiles or more. Other countries or regions may be similarly stored with a map database and divided into a plurality of tiles.

Figure 3:
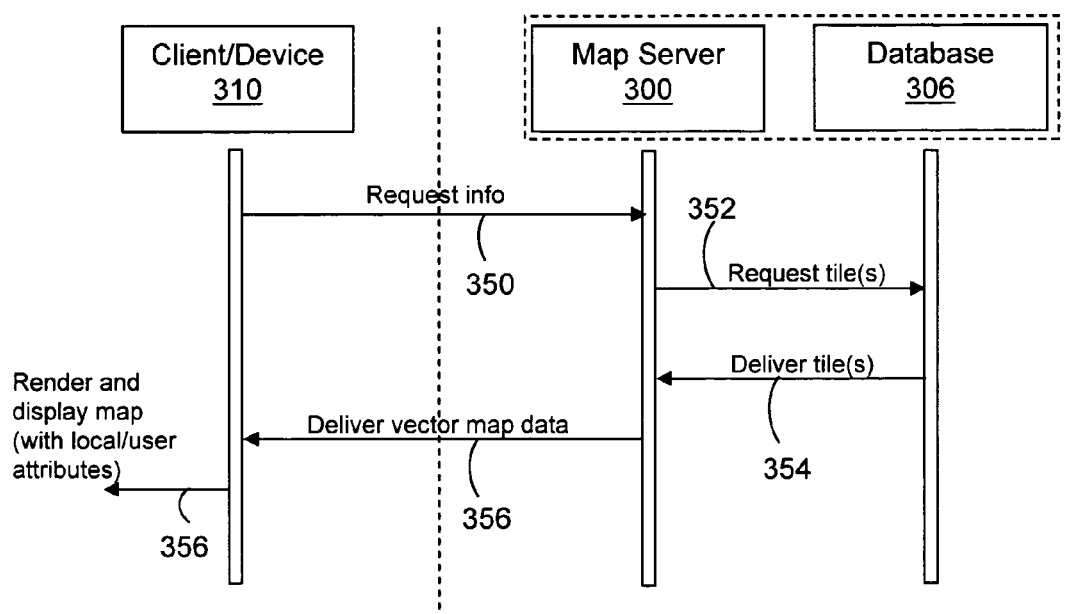
FIG. 3 illustrates an exemplary flow of information between a map server and a client device.

FIG. 3 illustrates the interaction of a client 310 and map server 300 according to one example. In this example, map server 300 is shown separate and in communication with a map database 306. It will be understood that map database 306 may be local or remote to map server 300, and further, that multiple map servers 300 and map databases 306 may be employed.

In one example, client 310 submits a request for a map image at 350 (e.g., in the form of a request for one or more tiles). The request may take various forms, e.g., a location or geographical location such as country, city, street address, and so on, as well as a search for a location such as business or event. For example, a user might request a map illustrating local restaurants, driving directions, or the nearest copy store. It should be recognized, of course, that the client may also be required to log into the system and be authenticated prior to or after requesting the map image (particularly for systems having local or user associated information capabilities). Further, in other examples, a client 310 may not specifically request a map image; however, based on the client's use or profile, a request for a map image may be identified by map server 300, for example, based on a search inquiry, context information, or the like.

Map server 300 receives and processes the map image request (e.g., the request for map tiles). In one example, the client 310 determines the tiles to be requested from the map server for rendering the image based on a map request. For example, the client 310 may request a certain number of tiles from map server 300 based on a look-up table or algorithm based on information associated the request (e.g., based on the location, zoom level, etc.).

In another example, map server 300 includes logic for requesting and supplying an appropriate tile or tiles of the vector image data to serve to client 310. For example, map server 300 may utilize a look-up table or algorithm to determine one or more tiles based on information associated the request (e.g., based on the location, zoom level, etc.). Map server 300 requests the appropriate tile (or tiles) of vector map data from map database 306 at 352 and receives the requested vector based map data at 354. In other examples, map server 300 may communicate location information or other sufficient information to map database 306, such that map database 306 will determine one or more tiles and return the appropriate tiled vector image data to map database 306 for transfer to client 310.

The vector map data is served to client 310 at 356. The client device 310 then renders the image using client vector rendering capabilities. For example, the client may include a browser having vector rendering capability natively (e.g., such as Canvas, SVG, VML, JAVA applet or the like) or having a vector rendering graphic plug-in (e.g., Flash or the like). Generally, map server 300 serves out vector data, including description of the geometry and labels, in a format the browser or other client-side application can recognize and render.

Additionally, the vector data may be rendered by the client with local or client specific attributes. Some client devices, e.g., "smart" or more capable client devices, may retrieve or alter attributes of the map, served with the vector data, and alter or customize the look and content of the displayed map. For example, a client may include a set of attributes (i.e., one or more attributes) relating to the language, color, highlighting, display of certain features (e.g., how to display highways versus side streets) of the map, and the like. Additionally, in some examples, a user may edit the vector image data, e.g., within the browser, to correct map geometry or geocoding (and in some examples, a user change may be communicated back to the map server for confirmation and/or availability to other users).

The ability to alter maps is generally more difficult for maps rendered with rastor data (even if tiled) because the data is pixel based and as such, the map server typically needs to store separate map image data for each different language, view, etc. Accordingly, serving vector image data and using local attributes provides greater flexibility and customization for the displayed map.

Additionally, the more capable a client device, the less information a map server may serve. For example, the client device may make more decisions etc., based on client attributes. This further, reduces the computational demands on the map server. Accordingly, the map server and client device may communicate to determine the capabilities of the client device and the amount or complexity of the vector data to be transferred.

The vector image data further allows customized labels or advertisements to be added to the map with less computational/memory demands on the server and client versus rastor imaging systems. For example, because labels and advertisements may be added with the attributes and are not part of the actual rastor image data, they may be changed more readily and easily by a server (e.g., the map server or another server such as an advertisement server) or the client device. For example, the map server or a third party server may associate advertisement information with the vector image data based, e.g., on a user profile or the map request, where the advertisement information may be embedded or overlaid with the displayed map image.

Figure 4:
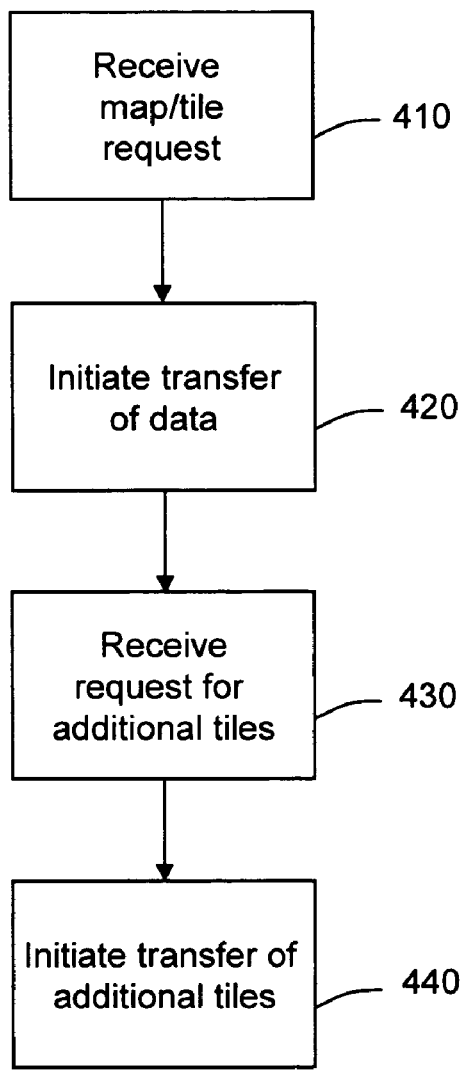
FIG. 4 illustrates an exemplary method for causing or initiating the transfer of tiled vector image data to a client for client-side rendering.

FIG. 4 illustrates an exemplary method for causing or initiating the transfer of tiled vector image data to a client for client-side rendering. The method may be carried out by logic included with one or both of a client device or a map server, for example, caused by a computer program product comprising program code for carrying out the method.

At 410 a map tile request is received. As described previously, the request may include a request from client device for one or more tiles of vector data. In other examples, the map request may comprise a client device requesting a map associated with a particular geographical location, which may be indicated by a street address, GPS coordinates, name of location, cell id, or the like.

In one example, a single tile is requested; however, depending on the zoom level or anticipated zooming and/or panning by the client device, multiple tiles may be identified for transfer. For example, with reference to FIG. 2, a map server may supply a grouping of tiles around a tile of interest for transfer. It is noted that the client device may have previously received and stored tiles, e.g., in local cache, and therefore request new tiles as needed on that basis.

At 420, the map server initiates the transfer of data corresponding to the map tiles requested in 410. In one example, one or more tiles corresponding to the particular location for display are transferred as well as one or more surrounding tiles to facilitate zooming and/or panning functions by the client device. In other examples, additional tiles for zooming and/or panning might be identified and/or stored in local memory for possible transfer in response to zooming and/or panning as needed.

In an instance where the user zooms or pans the displayed map image, the client device may generate, and the map server receive, a request at 430 for additional tiles (e.g., if not already with the client device). The client device may determine if additional tiles are needed at 430 (either for purposes of the immediate display needs or to have a predetermined surrounding number of tiles available to the user via a client cache). The additional tiles, if any, are requested by the client device and supplied or transferred at 440.

Figure 5:
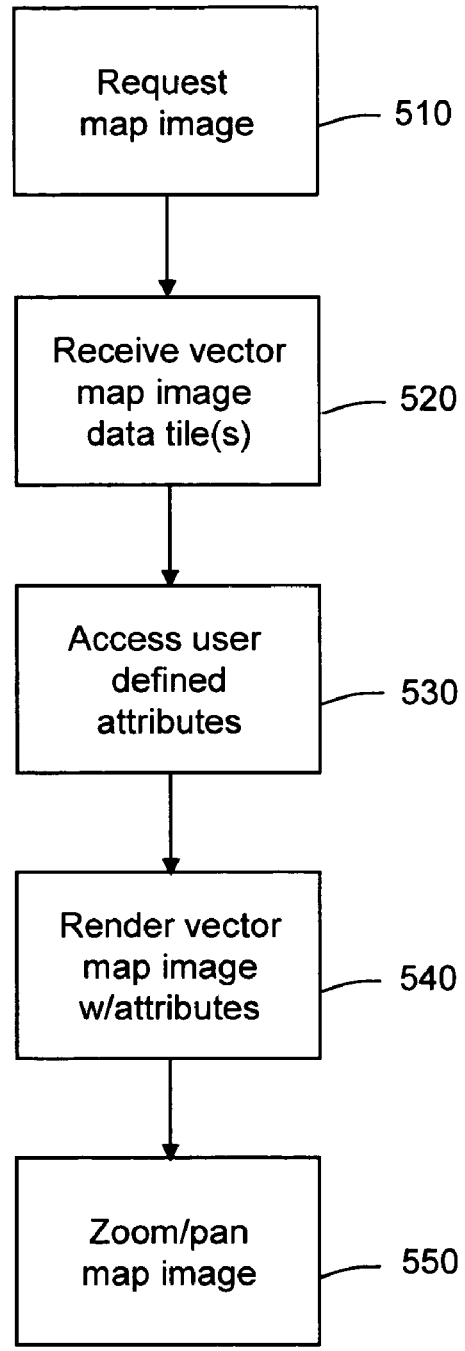
FIG. 5 illustrate an exemplary method for receiving and rendering tiled vector image data from a map server.

FIG. 5 illustrates an exemplary method for receiving and rendering tiled vector image data, e.g., at a client device. The exemplary method may be carried out by logic or programming on the client device, for example, by a Web browser or graphics application running on the client device. At 510 a map image is requested. The map image may be requested from a map server by the client device in response to user input such as a entering a location or requesting direction to a location. Further, the client device may processes the map request and determine one or more tiles to request from the map server.

At 520 the client device receives vector data associated with the requested tiles for rendering the map image. The vector data may be associated with one or more tiles determined by the client devices and/or the map server based on the map request information. Additionally, in addition to the vector data, the client device may further include advertisement data for displaying an advertisement with or adjacent the map image, the advertisement data received from the map server or a separate server (e.g., an advertisement server).

At 530 the client device may access attributes of the map image data, if any, for rendering the image. Attributes may include various information from language preferences, colors, map feature preferences (e.g., display a feature of the map such as freeways or parks in a particular manner), or the like. The attributes may be leveraged from user/client information such as a user profile, language settings of a client device, location of the client device (based on GPS, cell-id location, etc.) and so on. Additionally, a user may specifically enter display preferences for rendering map images.

At 540 the map image is rendered based on the vector data and the client device/user attributes (if any). In some examples, the user may enter or change attributes after displaying the map image and alter the displayed image. For example, a user may change the color(s) for viewing, change the language, correct map geometry or geocoding errors, etc., and re-display the image.

A user may further zoom or pan the displayed image at 550. Depending on the implementation and data received, the client device may render the new image based on vector data already received from the map server. In other examples, the client device may need to request additional data, e.g., additional tiles, from the map server (which in turn may request the appropriate tiles from a map database).

Additionally, a user may print the displayed image. As discussed above, the image data is vector data and may be generally printed at higher resolutions than typically used for display. Accordingly, in one example, the client device may print the map image at a resolution matching that of an associated printer.

While aspects of the invention are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
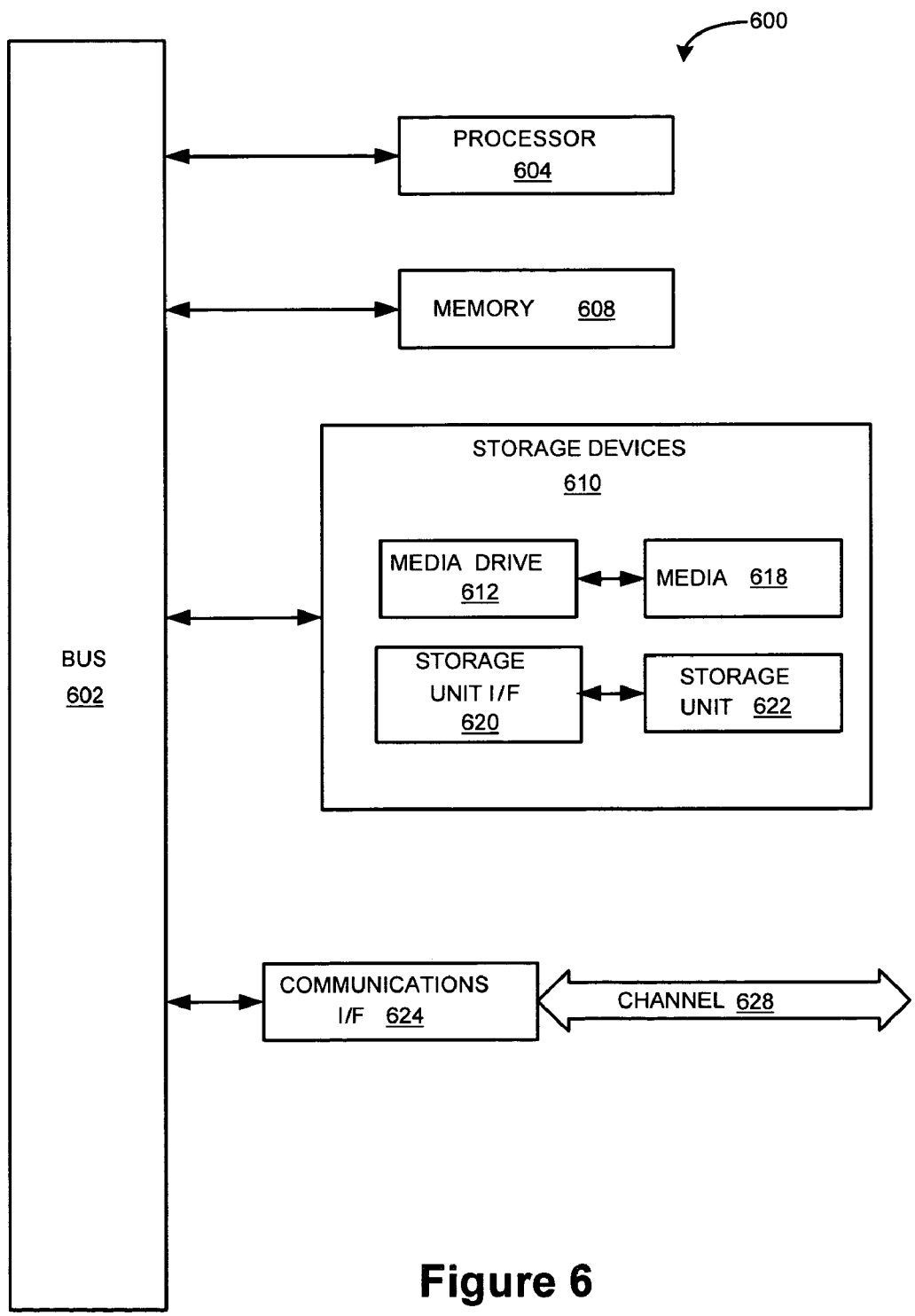
FIG. 6 illustrates an exemplary computing system that may be employed to implement processing functionality for various aspects of the invention.

FIG. 6 illustrates an exemplary computing system 600 that may be employed to implement processing functionality for various aspects of the invention (e.g., as a client device or a server device such as the described map server). Those skilled in the relevant art will also recognize how to implement the invention using other computer systems or architectures. Computing system 600 may represent, for example, a server (e.g., a map server), client device, desktop, laptop or notebook computer, hand-held computing device (PDA, cell phone, palmtop, etc.), mainframe, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, preferably random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable or cause the computing system 600 to perform features or functions of embodiments of the present invention.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus for serving data to render map images, the apparatus comprising:
   data transfer logic for causing a transfer of tiled vector image data for rendering a map image in response to a request for at least one tile of the tiled vector image data, wherein the vector image data comprises a first attribute associated therewith for rendering the image, the first attribute configurable by a receiving device of the vector image data.

2. The apparatus of claim 1, wherein the tiled vector image data is transferred to a remote device for rendering of the map image.

3. The apparatus of claim 1, wherein the tiled vector image data is transferred to a client device for client-side rendering of the map image.

4. The apparatus of claim 1, wherein the first attribute includes a language selection for altering text included with the image.

5. The apparatus of claim 1, wherein the first attribute is related to an imaging characteristic of the image.

6. The apparatus of claim 1, wherein the vector image data further comprises a second attribute associated therewith for rendering the image, the second attribute configurable by advertisement logic for including advertisement information with the rendered map image.

7. The apparatus of claim 1, further comprising selection logic for selecting at least one tile from the map image database based on the received request.

8. The apparatus of claim 1, wherein the first attribute is a client specific attribute and the image is rendered by the client.

9. An apparatus for rendering map image data received from a map server, the apparatus comprising:
   rendering logic for rendering a map image based on received vector image data and a set of local attributes, wherein the vector image data is associated with at least one tile of map image data.

10. The apparatus of claim 9, wherein the attribute relates to a language selection for text displayed with the map image.

11. The apparatus of claim 10, wherein the attribute is related to an imaging characteristic of the map image.

12. The apparatus of claim 9, further comprising printing logic for causing the map image to be printed at a greater resolution than a display image resolution.

13. The apparatus of claim 9, wherein the set of local attributes are client specific attributes.

14. A method for communicating a map to a client device, the method comprising:
   transferring vector image data to a receiving device in response to a request for a map, wherein the vector image data comprises:
      an attribute associated therewith for rendering the image, the attribute configurable by a receiving device of the vector image data; and
      at least one tile of tiled vector image data.

15. The method of claim 14, wherein the vector image data is transferred to a remote device for rendering of the map image.

16. The method of claim 14, wherein the vector image data is transferred to a client device for client-side rendering of the map image.

17. The method of claim 14, wherein the attribute includes a language selection for altering text included with the displayed map.

18. The method of claim 14, wherein the attribute is related to an imaging characteristic of the displayed map.

19. The method of claim 14, further comprising associating advertisement information with the vector image data.

20. The method of claim 14, wherein the attribute is a client specific attribute, the method further comprising rendering the image at the client device.

21. A computer readable storage medium comprising computer readable instructions for rendering tiled vector map image data, the computer readable storage medium comprising instructions for causing:
   a transfer of tiled vector image data to a receiving device for display of a map image, wherein the vector image data is associated with map image data divided into a plurality of tiles and the vector image data comprises an attribute associated therewith for rendering the image, the attribute configurable by a receiving device of the vector data.

22. The computer readable storage medium of claim 21, wherein the computer readable instructions further comprises instructions for causing the selection of at least one tile for transfer in response to a received request.

23. The computer readable storage medium of claim 21, wherein the tiled vector image data is transferred to a client device for client-side image rendering.

24. The computer readable storage medium of claim 21, wherein the attribute is a client specific attribute, wherein the computer readable instructions further comprises instructions for causing a rendering of the image by the receiving device of the vector data.

25. A computer readable storage medium comprising computer readable instructions for rendering tiled vector map image data, the computer readable storage medium comprising instructions for causing:

rendering of vector image data based upon received vector image data and a set of local attributes, wherein the vector image data is associated with at least one tile of map image data.

26. The computer readable storage medium of claim 25, wherein at least one attribute of the set of attributes relates to a language selection for text displayed with the map image.

27. The computer readable storage medium of claim 26, wherein at least one attribute of the set of attributes relates to an imaging characteristic of the displayed map.

28. The computer readable storage medium of claim 25, wherein the set of local attributes are client specific attributes.

* * * * *